United States Patent
Lee et al.

(10) Patent No.: US 11,749,794 B2
(45) Date of Patent: *Sep. 5, 2023

(54) ELECTROLYTIC COPPER FOIL FOR SECONDARY BATTERY AND METHOD FOR PRODUCING THE SAME

(71) Applicant: ILJIN MATERIALS CO., LTD., Iksan (KR)

(72) Inventors: Sun Hyoung Lee, Iksan (KR); Tae Jin Jo, Iksan (KR); Seul-Ki Park, Iksan (KR); Ki Deok Song, Iksan (KR)

(73) Assignee: ILJIN MATERIALS CO., LTD., Iksan (KR)

( * ) Notice: Subject to any disclaimer, the term of this patent is extended or adjusted under 35 U.S.C. 154(b) by 192 days.

This patent is subject to a terminal disclaimer.

(21) Appl. No.: 17/246,657

(22) Filed: May 2, 2021

(65) Prior Publication Data
US 2021/0257603 A1 Aug. 19, 2021

Related U.S. Application Data

(62) Division of application No. 16/343,527, filed as application No. PCT/KR2017/003361 on Mar. 28, 2017, now Pat. No. 11,171,319.

(30) Foreign Application Priority Data
Nov. 11, 2016 (KR) .......................... 10-2016-0150358

(51) Int. Cl.
| | | |
|---|---|---|
| H01M 4/134 | (2010.01) | |
| H01M 4/1395 | (2010.01) | |
| C22C 9/00 | (2006.01) | |
| C25D 3/38 | (2006.01) | |
| C25D 1/04 | (2006.01) | |
| H01M 4/04 | (2006.01) | |
| H01M 10/02 | (2006.01) | |
| H01M 4/66 | (2006.01) | |
| C25D 17/12 | (2006.01) | |

(52) U.S. Cl.
CPC ............. *H01M 4/0407* (2013.01); *C22C 9/00* (2013.01); *C25D 1/04* (2013.01); *C25D 3/38* (2013.01); *C25D 17/12* (2013.01); *H01M 4/0404* (2013.01); *H01M 4/66* (2013.01); *H01M 4/661* (2013.01); *H01M 10/02* (2013.01)

(58) Field of Classification Search
None
See application file for complete search history.

(56) References Cited

U.S. PATENT DOCUMENTS

2007/0287020 A1* 12/2007 Saito .................. C25D 1/04
428/606

* cited by examiner

*Primary Examiner* — Yoshitoshi Takeuchi
(74) *Attorney, Agent, or Firm* — Stein IP, LLC

(57) ABSTRACT

The present invention relates to an electrolytic copper foil for a secondary battery, and a method of producing the same. The electrolytic copper foil for a secondary battery exhibits a little change in a physical property caused by a difference in a crosshead speed when tensile strength and an elongation percentage of the electrolytic copper foil are measured, thereby achieving excellent charging and discharging characteristics of a battery and preventing exfoliation of an active material. The electrolytic copper foil for a secondary battery is produced from a plating solution containing Total Organic Carbon (TOC), cobalt, and iron by using a drum, in which a ratio of the TOC to the cobalt and the iron contained in the electrolytic copper foil follows Formula 1 below.

TOC/(cobalt+iron)=1.3 to 1.5  [Formula 1]

6 Claims, 1 Drawing Sheet

[FIG. 1]
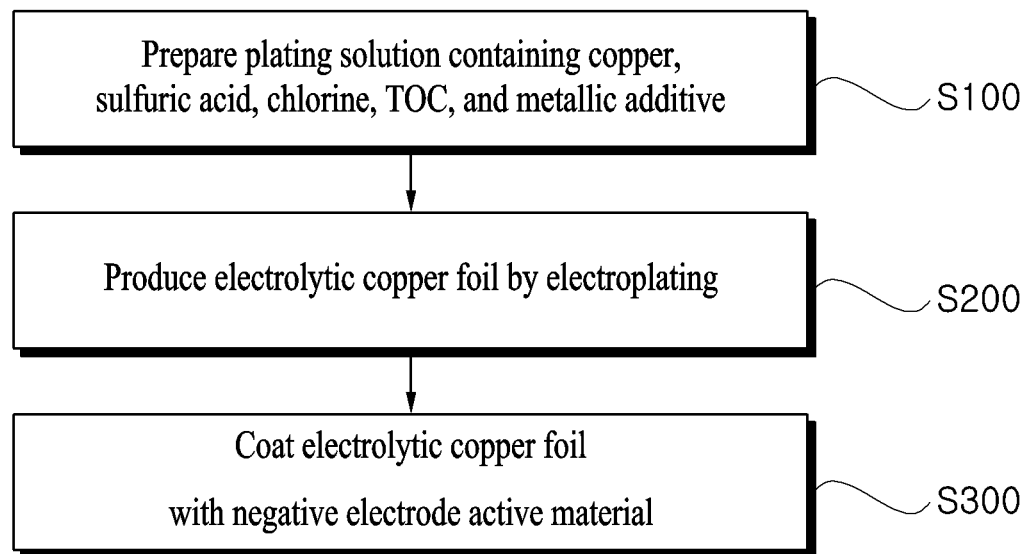
[FIG. 2]
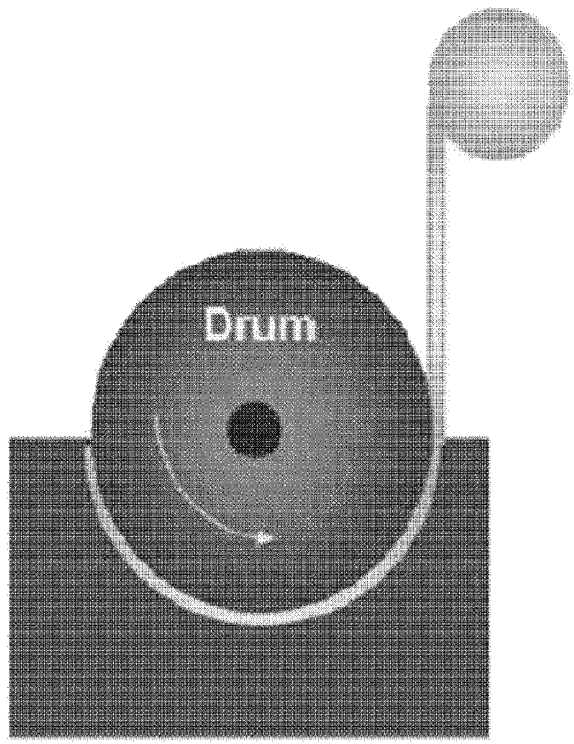

ELECTROLYTIC COPPER FOIL FOR SECONDARY BATTERY AND METHOD FOR PRODUCING THE SAME

CROSS-REFERENCE TO PRIOR APPLICATIONS

This application is divisional application of a U.S. patent application Ser. No. 16/343,527, filed on Apr. 19, 2019, which is a national Stage Patent Application of PCT International Patent Application No. PCT/KR2017/003361, filed on Mar. 28, 2017 under 35 U.S.C. § 371, which claims priority of Korean Patent Application No. 10-2016-0150358, filed on Nov. 11, 2016, which are all hereby incorporated by reference in their entirety.

TECHNICAL FIELD

The present invention relates to an electrolytic copper foil for a secondary battery, and a method of producing the same, and more particularly, to an electrolytic copper foil for a secondary battery, which exhibits a little change in a physical property caused by a difference in a crosshead speed when tensile strength and an elongation percentage of the electrolytic copper foil are measured, thereby achieving excellent charging and discharging characteristics of a battery and preventing exfoliation of an active material and a method of producing the same.

BACKGROUND ART

In general, an electrolytic copper foil is widely used as a basic material of a Printed Circuit Board (PCB) used in electric/electronic industrial fields, and demands thereof are rapidly increasing for small-sized products, such as a thin-type notebook computer, a Personal Digital Assistant (PDA), an e-book player, an MP3 player, a next-generation portable phone, and an ultra-thin flat panel display. Further, the electrolytic copper foil is widely used as a negative electrode current collector of a secondary battery by improving a physical property thereof.

In general, the electrolytic copper foil is generated by an electrolysis method and is produced in an electrolytic bath including a cylindrical negative electrode (which is also called a "drum") made of titanium, a positive electrode, which maintains a predetermined interval with the negative electrode and is made of titanium coated with a lead alloy or an iridium oxide, an electrolyte, and a power source of a current. The electrolyte is formed of sulfuric acid and/or copper sulphate, and when a direct current is made to flow between the negative electrode and the positive electrode while rotating the cylindrical negative electrode, copper is electrodeposited in the negative electrode, thereby continuously producing the electrolytic copper foil. As described above, a process of reducing copper ions to a metal by the electrolysis method is referred to as a foil producing process.

Next, the copper foil obtained by the foil producing process may be subjected to an additional surface treatment process, such as a roughness treatment process (which is also called a nodule treatment process) for improving adhesion with an insulating substrate, a diffusion preventing treatment for preventing diffusion of the copper ions, an anticorrosion treatment for preventing oxidation of the copper foil from the outside, and a chemical adhesion improving treatment for supplementing adhesion with the insulating substrate as necessary. When the surface treatment process passes, the copper foil becomes the copper foil for a low profile printed circuit, and when only the anticorrosion treatment is performed among the surface treatment processes, the copper foil becomes the copper foil for the secondary battery.

When the electrodeposited copper foil is used for the printed circuit, the copper foil is surface treated and then is supplied to a PCB processing company in the form (a laminated form) of being attached to the insulating substrate. In contrast to this, when the electrodeposited copper foil is used for a secondary battery, the copper foil passes only the anticorrosion treatment and is supplied to a secondary battery producing company.

When the electrolytic copper foil is used as a negative electrode current collector for a secondary battery, the copper foil is used by coating both surfaces of the copper foil with an electrode active material. In this case, when intensities of illumination of both surfaces of the electrolytic copper foil are different, a battery characteristic is changed, so that it is necessary to maintain the same or similar level of the intensities of illumination of both surfaces of the electrolytic copper foil.

In the meantime, when a difference in a crosshead speed is large when tensile strength and an elongation percentage of the copper foil is large, a physical property of the copper foil is changed to cause a degradation of charging/discharging characteristics of the battery and cause cracking or exfoliation of an active material. This is a phenomenon caused due to transformation of a crystal structure during electroplating of the copper foil, and when cracking or the exfoliation of the active material is generated in a battery, there is a problem in that battery life is shortened.

Accordingly, there is a demand for an electrolytic copper foil for a secondary battery, in which a crystal structure is prevented from being transformed when a copper foil is electroplated to exhibit a little difference a physical property according to a crosshead speed when the physical property of the copper foil is tested, thereby achieving excellent charging/discharging characteristics of a battery.

DISCLOSURE

Technical Problem

The present invention relates to an electrolytic copper foil for a secondary battery, in which Total Organic Carbon (TOC), and cobalt and iron which are metallic additives are made to be contained in a copper electrolyte by predetermined contents, thereby preventing a crystal structure from being transformed when a copper foil is plated and achieving excellent charging/discharging characteristics of the battery, and a method of producing the same.

Further, the present invention relates to an electrolytic copper foil for a secondary battery, in which even when a speed of a crosshead is changed when a physical property of a negative electrode of an electrolytic copper foil is measured, a change in the physical property is little, thereby preventing cracking of the battery or exfoliation of an active material, and a method of producing the same.

Technical Solution

According to one aspect of the present invention, an exemplary embodiment of the present invention includes an electrolytic copper foil for a secondary battery, which is produced from a plating solution containing Total Organic Carbon (TOC), cobalt, and iron by using a drum, and is coated with a negative electrode active material, in which a ratio of the TOC to the cobalt and the iron contained in the electrolytic copper foil follows Formula 1 below.

TOC/(cobalt+iron)=1.3 to 1.5 [Formula 1]

A difference in a crosshead speed for measuring tensile strength at a room temperature and 110° C. (six hours) may follow Formula 2, and a difference in a crosshead speed for measuring an elongation percentage at a room temperature and 110° C. (six hours) may follow Formula 3.

(Tensile strength at 1 mm/min crosshead speed)/
(Tensile strength at 50 mm/min crosshead speed)≥0.9 [Formula 2]

(Elongation percentage at 1 mm/min crosshead speed)/(Elongation percentage at 50 mm/min crosshead speed)≥0.8 [Formula 3]

A concentration of the TOC contained in the plating solution may be equal to or larger than 100 ppm.

Tensile strength of the electrolytic copper foil at a room temperature may be 40 kgf/mm² to 51 kgf/mm².

A thickness of the electrolytic copper foil may be 4 μm to 12 μm.

An elongation percentage of the electrolytic copper foil may be 2% to 18%.

According to another aspect of the present invention, an exemplary embodiment of the present invention includes a method of producing an electrolytic copper foil for a secondary battery, the method including: (1) preparing a plating solution containing copper, Total Organic Carbon (TOC), cobalt, and iron; (2) applying a current density of 30 Ampere per Square Deci-metre (ASD) to 150 ASD under a temperature condition of 30° C. to 70° C. and performing electroplating by using a drum; and (3) coating an electrolytic copper foil formed by the electroplating with a negative electrode active material, in which ratio of the TOC to the cobalt and the iron contained in the electrolytic copper foil follows Formula 1 below.

TOC/(cobalt+iron)=1.3 to 1.5 [Formula 1]

A difference in a crosshead speed for measuring tensile strength at a room temperature and 110° C. (six hours) may follows Formula 2, and a difference in a crosshead speed for measuring an elongation percentage at a room temperature and 110° C. (six hours) may follow Formula 3.

(Tensile strength at 1 mm/min crosshead speed)/
(Tensile strength at 50 mm/min crosshead speed)≥0.9 [Formula 2]

(Elongation percentage at 1 mm/min crosshead speed)/(Elongation percentage at 50 mm/min crosshead speed)≥0.8 [Formula 3]

A concentration of the TOC contained in the plating solution may be equal to or larger than 100 ppm.

Tensile strength of the electrolytic copper foil at a room temperature may be 40 kgf/mm² to 51 kgf/mm².

A thickness of the electrolytic copper foil may be 4 μm to 12 μm.

An elongation percentage of the electrolytic copper foil may be 2% to 18%.

Advantageous Effects

According to the present invention, it is possible to product the electrolytic copper foil for a secondary battery, in which Total Organic Carbon (TOC), and cobalt and iron which are metallic additives are made to be contained in a copper electrolyte by predetermined contents, thereby preventing a crystal structure from being transformed when a copper foil is plated and achieving excellent charging/discharging characteristics of the battery.

In addition, according to the present invention, it is possible to produce the electrolytic copper foil, in which a change in the physical property caused by a change in a speed of a crosshead when a physical property of a negative electrode of the electrolytic copper foil is measured, thereby preventing cracking of the battery or exfoliation of an active material.

DESCRIPTION OF DRAWINGS

FIG. 1 is a flowchart illustrating a method of producing an electrolytic copper foil for a secondary battery according to an exemplary embodiment of the present invention.

FIG. 2 is a diagram illustrating an operation of producing an electrolytic copper foil by using a drum according to an exemplary embodiment of the present invention.

BEST MODE

Other specific matters of the exemplary embodiment are included in the detailed description and the drawings.

Advantages and characteristics, and a method for achieving them will be clear when exemplary embodiments described in detail with reference to the accompanying drawings are referred to. However, the present invention is not limited to exemplary embodiments disclosed herein but will be implemented in various forms, and the exemplary embodiments are provided so that the present invention is completely disclosed, and a person of ordinary skilled in the art can fully understand the scope of the present invention, and the present invention will be defined only by the scope of the appended claims. Further, in the drawing, a part irrelevant to the present invention is omitted for clearness of the description of the present invention, and like reference numerals designate like elements throughout the specification.

Hereinafter, the present invention will be described with reference to the accompanying drawings.

Next, an electrolytic copper foil for a secondary battery according to an exemplary embodiment of the present invention will be described in more detail.

An electrolytic copper foil for a secondary battery according to an exemplary embodiment of the present invention is an electrolytic copper foil for a secondary battery which is produced by using a drum and is coated with a negative electrode active material, in which a difference in a crosshead speed for measuring tensile strength at a room temperature and 110° C. (six hours) follow Formula 2, and a difference in a crosshead speed for measuring an elongation percentage between at a room temperature and 110° C. (six hours) follow Formula 3.

(Tensile strength at 1 mm/min crosshead speed)/
(Tensile strength at 50 mm/min crosshead speed)≥0.9 [Formula 2]

(Elongation percentage at 1 mm/min crosshead speed)/(Elongation percentage at 50 mm/min crosshead speed)≥0.8 [Formula 3]

Even though a crosshead speed is increased during a tensile test of the electrolytic copper foil, a physical property of the copper foil needs to be uniform without a change even though various peak loads are applied, thereby improving charging/discharging characteristics of the battery and preventing cracking or exfoliation of an active material. However, when a crosshead speed is increased during a tensile test of the electrolytic copper foil, a peak load is increased, and when the peak load is increased, tensile strength is measured to be large and an elongation percentage is degraded. Further, in the case of the thin electrolytic copper foil, a notch effect is exhibited little, so that an elongation percentage value is measured to be relatively large.

In contrast to this, when a crosshead speed is low, a low peak load is applied and tensile strength is measured to be low, and in this case, a notch effect is exhibited large, so that tensile strength and an elongation percentage of the general electrolytic copper foil are degraded. Accordingly, when a difference in a physical property according to a measurement speed is little during the measurement of a physical property of a negative electrode of a base substrate, it is possible to prevent cracking of the base substrate and exfoliation of the active material when the amount of active material loaded to the base substrate is increased during the manufacturing of the negative electrode and then a battery is charged/discharged.

In the present invention, changes in a physical property according to differences in a crosshead speed for measuring tensile strength and an elongation percentage at a room temperature and a high temperature of 110° C. follow Formulae 2 and 3. In the present invention, in order to minimize a difference in the physical property according to the measurement speed of the crosshead speed, TOC is made to be contained in a copper electrolyte by a content of 100 ppm or more, so that it is possible to prevent the physical property from being changed even though various peak loads are applied according to a battery design and the amount of active material loaded.

TOC is an abbreviation of total organic carbon and refers to total organic carbon, and means the amount of carbon in an organic material contained in the plating solution, and is contained in a copper electrolyte to serve to minimize a difference in the physical property according to the difference in a measurement speed of the crosshead speed when tension of the copper foil is tested. In the case where dissolved carbon dioxide referred to as Total Inorganic Carbon (TIC), not the TOC, is contained in the copper electrolyte or carbon adsorbed to copper ions is present in the copper electrolyte, when the copper foil is left for a long time at a high temperature due to vacuum drying, additives present in an intercrystalline are diffused to a grain boundary to cause abnormal growth of the grain and a change in the crystal structure. However, when the TOC is contained in the copper electrolyte by 100 ppm or more like the present invention, a crystal structure is prevented from being transformed during the electroplating, so that the uniform physical property is exhibited even though various peak loads are applied.

Accordingly, in the electrolytic copper foil for the secondary battery according to the present invention, the differences in tensile strength and an elongation percentage according to the difference in the crosshead speed at a room temperature and a high temperature (110° C.) are little, so that there is an advantage in that charging/discharging characteristics of the battery are excellent.

Accordingly, as described above, in the electrolytic copper foil for the secondary battery according to the present invention, differences in tensile strength and an elongation percentage according to the crosshead speed for measuring tensile strength and an elongation percentage may be included in the ranges of Formulae 2 and 3, and when differences in tensile strength according to the difference in the crosshead speed for measuring tensile strength at a room temperature and a temperature of 110° C. is smaller than 0.9, the active material is exfoliated and cracking is generated, thereby shortening battery life, and when differences in an elongation percentage according to the difference in the crosshead speed for measuring an elongation percentage at a room temperature and a temperature of 110° C. is smaller than 0.8, the active material is exfoliated and cracking is generated, thereby shortening battery life.

FIG. 1 is a flowchart illustrating a method of producing an electrolytic copper foil for a secondary battery according to an exemplary embodiment of the present invention. Referring to FIG. 1, a method of producing an electrolytic copper foil for a secondary battery according to the present invention includes: (1) preparing a plating solution containing copper ions ($Cu^{2+}$) of 60 g/L to 140 g/L, sulfuric acid of 70 g/L to 200 g/L, chlorine of 10 ppm to 90 ppm, TOC of 100 ppm or more, and cobalt and iron as metallic additives (S100); (2) applying a current at a current density of 30 ASD to 150 ASD under a temperature condition of 30° C. to 70° C. and performing electroplating by using a drum (S200); and (3) coating the electrolytic copper foil formed by the electroplating with a negative electrode active material (S300).

In operation (1) (S100), as the operation of preparing the plating solution, the plating solution containing copper ions ($Cu^{2+}$) of 60 g/L to 140 g/L, sulfuric acid of 70 g/L to 200 g/L, chlorine of 10 ppm to 90 ppm, TOC of 100 ppm or more, and cobalt and iron is prepared. In the plating solution, the TOC serves to minimize a difference in a physical property according to a measurement speed of a crosshead speed when tension of the electrolytic copper foil coated with the negative active material is tested.

Further, in the present invention, in order to minimize a change in a physical property of a copper foil due to the difference in the crosshead speed, the cobalt and the iron are additionally contained as metallic additives, in addition to the TOC. The electrolytic copper foil may be produced by electroplating the plating solution, and the TOC may be contained in the plating solution by a predetermined content, the cobalt may be contained by 1 mg/L to 50 mg/L, and the iron may be contained by 400 mg/L to 1100 mg/L.

In the electrolytic copper foil formed by electroplating the plating solution containing the TOC, the cobalt, and the iron, the content of the TOC may be 100 ppm or more, and the contents of the cobalt and the iron contained may correspond to Formula 1 below.

When the electrolytic copper foil is produced by electroplating the plating solution, concentrations of the additives, for example, the TOC, the cobalt, and the iron, contained in the plating solution are not always the same as those of the electrolytic copper foil produced by the electroplating, but may be the same as or smaller than those of the electrolytic copper foil produced by the electroplating.

The cobalt and the iron flatten a surface of the electrolytic copper foil by adjusting a plating speed of copper during the electroplating, and control an excessive increase in the carbon content in the electrolytic copper foil. Accordingly, when a ratio of the TOC to the cobalt and the iron within the electrolytic copper foil is within the range of Formula 1 below, a change in the physical property of the copper foil due to the difference in the crosshead speed is minimized.

$$\text{TOC}/(\text{cobalt}+\text{iron})=1.3 \text{ to } 1.5 \qquad \text{[Formula 1]}$$

When the ratio of the TOC to the cobalt and the iron is less than 1.3, the contents of the cobalt and the iron added to the plating solution are increased to prevent the TOC within the plating solution from preventing the abnormal growth of the grain, so that the ratio less than 1.3 is not preferable, and when the ratio is greater than 1.5, stress is generated within the grain due to the excessive content of the TOC within the electrolytic copper foil and the grain within the electrolytic copper foil is abnormally grown after plating, so that the change in the physical property of the electrolytic copper foil may become severe when measurement speeds of the tensile strength and an elongation percentage are changed. Accordingly, in order to minimize a change in the physical property of the electrolytic copper foil even when the measurement speeds of the tensile strength and the elongation percentage are changed, the ratio of the TOC to the cobalt and the iron may be maintained in the range of 1.3 to 1.5 as expressed in Formula 1.

When the copper ions and the sulfuric acid ions in the plating solution are out of the range, there is a problem in that the copper foil is not properly precipitated or hardness of the copper foil is degraded in the subsequently performed electroplating.

In addition, chlorine of 10 ppm to 90 ppm is contained in the plating solution, and the chlorine suppresses crystal growth of a precipitate of $CuCl_2$ formed on a grain boundary interface during the electroplating when the precipitate is heated at a high temperature to improve thermal stability at a high temperature. When a concentration of the chlorine is out of the range of 10 ppm to 90 ppm, tensile strength of the electrolytic copper foil may be degraded and thermal stability of the electrolytic copper foil at a high temperature may be degraded.

In operation (2) (S200), a current density of 30 ASD to 150 ASD is applied the plating solution prepared in operation (1) under a temperature condition of 30° C. to 70° C., and electroplating is performed by using a drum. For reference, FIG. 2 is a diagram illustrating an operation of producing an electrolytic copper foil by using a drum according to an exemplary embodiment of the present invention. When the plating temperature and the current density are out of the foregoing ranges, the plating is not property performed, so that a surface of the electrolytic copper foil is not uniformly formed, or tensile strength and an elongation rate are degraded, thereby causing degradation of performance of a battery.

Operation (3) (S300) includes an operation of coating the electrolytic copper foil formed by the electroplating with a negative electrode active material, and in the electrolytic copper foil coated with the negative electrode active material formed by operation (3) (S300), a difference in a crosshead speed for measuring tensile strength at a room temperature and 110° C. (six hours) may follow Formula 2, and a difference in a crosshead speed for measuring an elongation percentage at a room temperature and 110° C. (six hours) may follow Formula 3.

(Tensile strength at 1 mm/min crosshead speed)/
(Tensile strength at 50 mm/min crosshead
speed)≥0.9     [Formula 2]

(Elongation percentage at 1 mm/min crosshead
speed)/(Elongation percentage at 50 mm/min
crosshead speed)≥0.8     [Formula 3]

Further, tensile strength of the electrolytic copper foil for the secondary battery according to the present invention at a room temperature may be 40 kgf/mm² to 51 kgf/mm². When the tensile strength at the room temperature is less than 40 kgf/mm², there may be a problem in that the electrolytic copper foil is fractured and the positive electrode and the negative electrode are short-circuited. When the secondary battery is charged/discharged, the secondary battery is expanded or contracted in a process where other active materials, such as graphite, transceive lithium ions, and in this case, an active material layer is in close contact with the electrolytic copper foil, so that stress is generated due to the expansion or the contraction. Accordingly, when the tensile strength is less than 40 kgf/mm², the electrolytic copper foil cannot resist the stress and is fractured, so that it is impossible to maintain performance of the battery, and the electrolytic copper foil is transformed due to the fracture, so that there is a problem in that the positive electrode and the negative electrode are short-circuited.

Further, a thickness of the electrolytic copper foil may be 4 μm to 12 μm. When the thickness of the electrolytic copper foil is less than 4 μm, the electrolytic copper foil may be easily fractured due to the small thickness, and when the thickness of the electrolytic copper foil is larger than 12 μm, a volume and weight of a produced secondary battery are increased, so that the thickness of the electrolytic copper foil larger than 12 μm is not preferable.

Further, an elongation percentage of the electrolytic copper foil may be 2 to 18%. When the elongation percentage of the electrolytic copper foil is large, the electrolytic copper foil resists tension when the active material is coated in an electrode manufacturing process to prevent the electrolytic copper foil from being fractured in the process, and it is possible to prevent the electrolytic copper foil from being fractured due to stress applied in a process of winding an electrode. In addition, during a charging/discharging cycle of the battery, the battery is prevented from efficiency degradation and from being fractured to improve performance of the battery. However, when the elongation percentage is larger than 18%, the secondary battery is considerably transformed during the charging/discharge to cause a short circuit, and when the elongation percentage is less than 2%, the electrolytic copper foil may be easily fractured.

The tensile strength and the elongation percentage are inversely proportional to each other, so that when the tensile strength is increased, the elongation percentage is decreased, and when the tensile strength is decreased, the elongation percentage is increased. Therefore, in order to produce the electrolytic copper foil, which is prevented from being fractured and has high tensile strength, it is important to maintain tensile strength and an elongation percentage within appropriate ranges. Accordingly, it is preferable that the tensile strength maintains 40 kgf/mm² to 51 kgf/mm², and when the elongation percentage maintains the range of 2% to 18%, it is possible to prevent the positive electrode and the negative electrode from being short-circuited when the secondary battery is transformed.

Hereinafter, Examples of the present invention and Comparative Examples will be described. However, the Examples below are simply examples of the present invention, and the scope of the present invention is not limited by the Examples.

Experiment 1. Test of Battery Life According to TOC Concentration, Tensile Strength, and Elongation Percentage at Room Temperature Example 1

A plating solution containing copper ions of 95 g/L, sulfuric acid of 110 g/L, chlorine of 30 ppm, TOC of 360 ppm, cobalt of 0.025 g/L, and iron of 0.75 g/L (a sum of cobalt and iron is 0.775 g/L) was prepared, electroplating was performed at a temperature of 50° C. by applying a current density of 90 ASD by using a drum, an electrolytic copper foil formed by the electroplating was coated with a negative electrode active material.

Examples 2 to 8

Electrolytic copper foils were produced by the same manner as that of Example 1, except for a concentration of TOC and the amounts of cobalt and iron, which are represented in Tables 2 and 3 below, contained in a plating solution.

Comparative Examples 1 to 3

In Comparative Examples 1 to 3, electrolytic copper foils were produced under the same condition as that of Example 1, except for concentrations of TOC and the amounts of cobalt and iron, which are represented in Tables 2 and 3 below, contained when a plating solution is prepared.

The experiment conditions of Examples 1 to 8 and Comparative Examples 1 to 3 are described above, and tensile strength and elongation percentages before vacuum drying, a difference in a crosshead speed for measuring tensile strength and elongation percentages, ratio values of the TOC to the cobalt and the iron after the copper foil is melted, battery life after 300 cycles of the electrolytic copper foils for a secondary battery produced by the methods were measured and are represented in Tables 2 and 3 below.

A maximum load of tensile strength measured by collecting a tensile specimen having a width of 12.7 mm x a gauge length of 50 mm from the electrolytic copper foil obtained from each of Examples 1 to 8 and Comparative Examples 1 to 3 and performing a tensile test at a different crosshead speed under the standard of IPC-TM-650 2.4.18B is referred to as tensile strength, and an elongation percentage when the electrolytic copper foil is broken is referred to as an elongation percentage. The crosshead speed is 1 mm/min and 50 mm/min and the test was performed at a room temperature (20° C.).

Further, the ratio value of the TOC to the cobalt and the iron after the copper foil was melted was analyzed by melting the electrolytic copper foil obtained from each of Examples 1 to 8 and Comparative Examples 1 to 3 in hydrochloric acid (35%) of 60 ml and hydrogen peroxide solution (30%) of 40 ml and then using Inductively Coupled Plasma (ICP) mass spectrometry. The ratio value of the TOC to the cobalt and the iron is calculated by using Formula 1 below, and a result of the calculation is represented in Table 3 below.

The experiment was performed under a battery evaluation condition below, and the experiment was performed under conditions of a cell design, a positive electrode, a negative electrode, a separator, and an electrolyte, which are represented in Table 1 below.

Constant current charging: Current value of 1 C, charging termination voltage of 4.2 V
Pause for 20 minutes
Constant current discharging: Current value of 1 C, charging termination voltage of 2.5V cut off
1 C=487 mAh
Cycle: Evaluation after 30 cycles, temperature: 55° C.

TABLE 1

| Major category | Minor category | Unit | Battery configuration |
|---|---|---|---|
| Cell design | Size | mm | 34 × 50 |
| | Capacity | mAh | 487 |
| | Current density | mAh/cm$^2$ | 3.06 |
| | N/P ratio | — | 1.10 |
| Positive electrode | Active material | — | LCO |
| | Composition | Active material:conductive material:binder | 92:4:4 |
| | L/L | mg/cm$^2$ | 21.72 |
| | Mixture density | g/cm$^3$ | 3.0 |
| Negative electrode | Active material | — | Graphite (natural graphite) |
| | Composition | Active material:thickner:binder | 96:2:2 |
| | L/L | mg/cm$^2$ | 9.00 |
| | Mixture density | g/cm$^3$ | 1.50 |
| Separator | Material | — | PE |
| | Thickness | μm | 16 |
| Electrolyte | Salt | — | 1.0M LiPF$_6$ |
| | Solvent | — | EC:EMC = 3:7 |
| | Additive | — | VC 3% |
| | Liquid measure | ∝ | 2.0 |

TABLE 2

| Category | Thickness (μm) | Tensile strength at 50 mm/min crosshead speed | Elongation percentage at 50 mm/min crosshead speed | Tensile strength at 1 mm/min crosshead speed | Elongation percentage at 1 mm/min crosshead speed |
|---|---|---|---|---|---|
| Example 1 | 4 | 43.7 | 3.2 | 39.4 | 2.6 |
| Example 2 | 6 | 47.4 | 6.8 | 44.5 | 6.1 |
| Example 3 | 6 | 50.1 | 7.2 | 47.6 | 6.5 |
| Example 4 | 8 | 43.4 | 8.0 | 40.4 | 7.1 |
| Example 5 | 10 | 47.1 | 9.8 | 44.0 | 8.3 |
| Example 6 | 10 | 41.3 | 11.8 | 38.4 | 10.0 |
| Example 7 | 12 | 49.2 | 10.5 | 46.7 | 9.6 |
| Example 8 | 12 | 44.7 | 7.3 | 42.5 | 6.6 |
| Example 9 | 12 | 43.4 | 18 | 41.2 | 16.4 |
| Comparative Example 1 | 6 | 35.1 | 6.2 | 29.1 | 4.8 |
| Comparative Example 2 | 8 | 33.0 | 10.1 | 27.7 | 7.5 |
| Comparative Example 3 | 10 | 33.0 | 12.4 | 29.0 | 8.7 |

TABLE 3

| Category | Tensile strength at 1 mm/min crosshead speed / Tensile strength at 50 mm/min crosshead speed 1 mm/min | Elongation percentage at 1 mm/min crosshead speed / Elongation percentage at 50 mm/min crosshead speed | TOC concentration | TOC/(Co + Fe) after melting foil | 300 Battery life after 300 cycles |
|---|---|---|---|---|---|
| Example 1 | 0.90 | 0.81 | 360 | 1.44 | 88.3 |
| Example 2 | 0.93 | 0.89 | 330 | 1.41 | 88.4 |
| Example 3 | 0.95 | 0.9 | 450 | 1.38 | 88.5 |
| Example 4 | 0.93 | 0.89 | 1080 | 1.48 | 87.8 |
| Example 5 | 0.93 | 0.84 | 340 | 1.50 | 88.1 |
| Example 6 | 0.93 | 0.85 | 650 | 1.30 | 88.2 |
| Example 7 | 0.95 | 0.91 | 350 | 1.43 | 88.6 |
| Example 8 | 0.95 | 0.91 | 680 | 1.46 | 87.4 |
| Example 9 | 0.95 | 0.91 | 100 | 1.42 | 87.1 |

TABLE 3-continued

| Category | Tensile strength at 1 mm/min crosshead speed/ Tensile strength at 50 mm/min crosshead speed 1 mm/min | Elongation percentage at 1 mm/min crosshead speed/ Elongation percentage at 50 mm/ min crosshead speed | TOC concen- tration | TOC/ (Co + Fe) after melting foil | 300 Battery life after 300 cycles |
|---|---|---|---|---|---|
| Comparative Example 1 | 0.83 | 0.78 | 80 | 1.04 | 82.9 (breakage or peeling) |
| Comparative Example 2 | 0.84 | 0.74 | 99 | 1.11 | 85.4 (fracture or peeling) |
| Comparative Example 3 | 0.88 | 0.7 | 70 | 1.08 | 81.8 (fracture or peeling) |

Referring to Tables 2 and 3, in Comparative Examples 1 to 3, in which the TOC concentrations are less than 100 ppm, it can be seen that all of the differences in the crosshead speed for measuring tensile strength and an elongation percentage of Formula 2 are less than 0.9 and less than 0.8, respectively. However, in Examples 1 to 8, in which the TOC concentrations are all 100 ppm or more, it can be seen that all of the differences in the crosshead speed for measuring tensile strength and an elongation percentage of Formula 2 are equal to or larger than 0.9 and equal to or larger than 0.8, respectively. When the TOC is contained in the plating solution by 100 ppm or more during the production of the electrolytic copper foil, it is possible to prevent a crystal structure within the copper foil from being changed during the electroplating, so that a change in a physical property of the electrolytic copper foil is little even though the measurement speeds are different in the process of measuring tensile strength and the elongation percentage, and thus it can be seen that battery life is excellent.

Further, in Comparative Examples 1 to 3, in which all of the ratios of TOC/(cobalt+iron) are less than 1.3, it can be seen that the changes in the tensile strength and the elongation percentage of the electrolytic copper foil according to the differences in the crosshead speed for measuring tensile strength and an elongation percentage are larger than those of Examples 1 to 8, and battery life is very short. In the case where the ratio of TOC/(cobalt+iron) is equal to or less than 1.3, the contents of the cobalt and the iron are increased to cause the TOC within the plating solution to prevent the abnormal growth of the grain, so that the change in physical properties of the electrolytic copper foil after the tensile strength and the elongation percentages are measured is considerable.

In addition, in Table 3, the batteries according to Examples 1 to 8 and Comparative Examples 1 to 3, in which capacities were checked after 300 cycles, were disassembled for checking states of the electrolytic copper foils (acting as negative electrode plates). In this case, it can be seen that the electrolytic copper foils according to Examples 1 to 8 have the same appearances as the first appearances without appearance defects. Meanwhile, in Comparative Examples 1 to 3, it can be seen that a part of the electrolytic copper foil is fractured or peeled, and in the case of Comparative Example 1, it can be seen that there is a portion in which the negative electrode active material is peeled from the electrolytic copper foil, and in Comparative Examples 2 and 3, it can be seen that a fractured portion is formed on an external portion of the electrolytic copper foil.

Experiment 2. Test of Battery Life According to TOC Concentration, Tensile Strength, and Elongation Percentage at 110° C.

In Experiment 2 of the present invention, for the electrolytic copper foil for the secondary battery according to the exemplary embodiment of the present invention, differences in a crosshead speed for measuring tensile strength and an elongation percentage when the TOC concentration and the amount of metallic additives are changed were measured, and battery life were measured, and the experiment was performed at a high temperature of 110° C.

Experiment 2 was performed by setting a battery evaluation condition, and the conditions of a cell design, a positive electrode, a negative electrode, a separator, and an electrolyte to be same as those of Experiment 1.

Further, in Experiment 2, the electrolytic copper foils were produced by setting the experiment conditions of Examples 1 to 8 and Comparative Examples 1 to 3 to be the same as that of Experiment 1, and tensile strength, an elongation percentage, and battery life after 300 cycles were measured except that the crosshead speeds for measuring tensile strength and an elongation percentage of the electrolytic copper foil for the secondary battery produced by each of the methods at 110° C. for six hours, and the results thereof are represented in Tables 4 and 5 below.

TABLE 4

| Category | Thick- ness (μm) | Tensile strength at 50 mm/min crosshead speed | Elongation percentage at 50 mm/min crosshead speed | Tensile strength at 1 mm/min crosshead speed | Elongation percentage at 1 mm/min crosshead speed |
|---|---|---|---|---|---|
| Example 1 | 4 | 42.9 | 2.8 | 38.6 | 2.3 |
| Example 2 | 6 | 46.6 | 5.9 | 44.3 | 5.2 |
| Example 3 | 6 | 49.0 | 7.3 | 46.6 | 6.6 |
| Example 4 | 8 | 42.5 | 7.2 | 39.5 | 6.4 |
| Example 5 | 8 | 46.1 | 9.9 | 43.3 | 9.7 |
| Example 6 | 10 | 40.4 | 10.5 | 37.6 | 8.9 |
| Example 7 | 10 | 48.2 | 11.5 | 45.8 | 10.5 |
| Example 8 | 12 | 43.8 | 7.5 | 41.6 | 6.8 |
| Example 9 | 12 | 42.5 | 20 | 40.4 | 18.2 |
| Comparative Example 1 | 6 | 35.1 | 6.2 | 29.1 | 4.8 |
| Comparative Example 2 | 8 | 33.0 | 10.1 | 27.7 | 7.5 |
| Comparative Example 3 | 10 | 33.0 | 12.4 | 29.0 | 8.7 |

TABLE 5

| Category | Tensile strength at 1 mm/min crosshead speed/ Tensile strength at 50 mm/min crosshead speed | Elongation percentage at 1 mm/min crosshead speed/ Elongation percentage at 50 mm/min crosshead speed | TOC concen- tration | TOC/ (Co + Fe) after melting foil | Battery life after 300 cycles |
|---|---|---|---|---|---|
| Example 1 | 0.9 | 0.81 | 360 | 1.44 | 88.3 |
| Example 2 | 0.95 | 0.88 | 330 | 1.41 | 88.4 |
| Example 3 | 0.95 | 0.9 | 450 | 1.38 | 88.5 |
| Example 4 | 0.93 | 0.89 | 1080 | 1.48 | 87.8 |

TABLE 5-continued

| Category | Tensile strength at 1 mm/min crosshead speed/ Tensile strength at 50 mm/min crosshead speed | Elongation percentage at 1 mm/min crosshead speed/ Elongation percentage at 50 mm/min crosshead speed | TOC concentration | TOC/ (Co + Fe) after melting foil | Battery life after 300 cycles |
|---|---|---|---|---|---|
| Example 5 | 0.94 | 0.98 | 340 | 1.50 | 88.1 |
| Example 6 | 0.93 | 0.85 | 650 | 1.30 | 88.2 |
| Example 7 | 0.95 | 0.91 | 350 | 1.43 | 88.6 |
| Example 8 | 0.95 | 0.91 | 680 | 1.46 | 87.4 |
| Example 9 | 0.95 | 0.91 | 100 | 1.42 | 87.1 |
| Comparative Example 1 | 0.83 | 0.78 | 80 | 1.04 | 82.9 (fracture or peeling) |
| Comparative Example 2 | 0.84 | 0.74 | 99 | 1.11 | 85.4 (fracture or peeling) |
| Comparative Example 3 | 0.88 | 0.7 | 70 | 1.08 | 81.8 (fracture or peeling) |

Referring to Tables 4 and 5, in Comparative Examples 1 to 3, in which the TOC concentrations are less than 100 ppm, it can be seen that all of the differences in the crosshead speed for measuring tensile strength and an elongation percentage of Formula 2 are less than 0.9 and less than 0.8, respectively. However, in Examples 1 to 8, in which the TOC concentrations are all 100 ppm or more, it can be seen that all of the differences in the crosshead speed for measuring tensile strength and an elongation percentage of Formula 2 are equal to or larger than 0.9 and equal to or larger than 0.8, respectively. Further, in Comparative Examples 1 to 3, in which all of the ratios of TOC/(cobalt+iron) are less than 1.3, it can be seen that the changes in tensile strength and an elongation percentage of the electrolytic copper foil according to the difference in the crosshead speed for measuring tensile strength and an elongation percentage are exhibited larger than those of Examples 1 to 8, and battery life is very short.

Accordingly, it can be seen that the cobalt and the iron, which are the metallic additives, and the TOC are made to be contained by the predetermined contents in the copper foil of the electrolytic copper foil for the secondary battery according to the present invention, so that it is possible to minimize a change in a physical property of the electrolytic copper fil even at a room temperature and a high temperature (110° C.).

Further, when the batteries according to Examples 1 to 8 and Comparative Examples 1 to 3, in which capacities were checked after 300 cycles in Table 5, were disassembled for checking states of the electrolytic copper foils (acting as negative electrode plates), it can be seen that the electrolytic copper foils according to Examples 1 to 8 have the same appearances as the first appearances without appearance defects. However in Comparative Examples 1 to 3, it can be seen that parts of the electrolytic copper foil is fractured or peeled.

It will be understood by those skilled in the art that various changes in a specific form and details may be made therein without the change of the technical spirit or the essential features of the present invention. Thus, it is to be appreciated that the embodiments described above are intended to be illustrative in every sense, and not restrictive. The scope of the present invention is represented by the scope of the claims described below rather than the detailed description, and it shall be construed that all of the changes or modified forms derived from the meanings and the scope of the claims, and the equivalent concept thereof are included in the scope of the present invention.

The invention claimed is:

1. A method of producing an electrolytic copper foil for a secondary battery, the method comprising:
   preparing a plating solution containing copper, Total Organic Carbon (TOC), cobalt, and iron; and
   applying a current density of 30 Ampere per Square Deci-metre (ASD) to 150 ASD under a temperature condition of 30° C. to 70° C. and performing electroplating by using a drum,
   wherein a ratio of the TOC to the cobalt and the iron contained in the electrolytic copper foil follows Formula 1 below:

TOC/(cobalt+iron)=1.3 to 1.5   [Formula 1].

2. The method of claim 1, wherein a difference in a crosshead speed for measuring tensile strength at room temperature and 110° C. (six hours) follows Formula 2, and a difference in a crosshead speed for measuring an elongation percentage at room temperature and 110° C. (six hours) follows Formula 3:

(Tensile strength at 1 mm/min crosshead speed)/ (Tensile strength at 50 mm/min crosshead speed)≥0.9   [Formula 2]

(Elongation percentage at 1 mm/min crosshead speed)/(Elongation percentage at 50 mm/min crosshead speed)≥0.8   [Formula 3].

3. The method of claim 1, wherein a concentration of the TOC contained in the plating solution is equal to or larger than 100 ppm.

4. The method of claim 1, wherein tensile strength of the electrolytic copper foil at room temperature is 40 kgf/mm$^2$ to 51 kgf/mm$^2$.

5. The method of claim 1, wherein a thickness of the electrolytic copper foil is 4 μm to 12 μm.

6. The method of claim 1, wherein an elongation percentage of the electrolytic copper foil is 2% to 18%.

* * * * *